United States Patent
Kawai

(10) Patent No.: US 12,234,000 B2
(45) Date of Patent: Feb. 25, 2025

(54) OUTBOARD MOTOR

(71) Applicant: HONDA MOTOR CO., LTD., Tokyo (JP)

(72) Inventor: Norikazu Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 443 days.

(21) Appl. No.: 17/676,901

(22) Filed: Feb. 22, 2022

(65) Prior Publication Data

US 2022/0281577 A1    Sep. 8, 2022

(30) Foreign Application Priority Data

Mar. 5, 2021  (JP) ................. 2021-035255

(51) Int. Cl.
*B63H 20/28*  (2006.01)
*B63H 23/06*  (2006.01)
*B63H 23/34*  (2006.01)
*H02K 9/19*  (2006.01)

(52) U.S. Cl.
CPC ............. *B63H 20/28* (2013.01); *B63H 23/06* (2013.01); *B63H 23/34* (2013.01); *H02K 9/19* (2013.01)

(58) Field of Classification Search
CPC .......... H02K 9/19; B63H 20/28; B63H 23/06; B63H 23/28
See application file for complete search history.

(56) References Cited

U.S. PATENT DOCUMENTS

| | | | | |
|---|---|---|---|---|
| 10,150,550 B2* | 12/2018 | Nakamura | ............ | B63H 23/30 |
| 11,697,484 B2* | 7/2023 | Miyagi | ............... | H02P 29/0241 440/6 |
| 2006/0025025 A1* | 2/2006 | Kitani | .................... | B63H 20/02 440/6 |
| 2017/0349256 A1* | 12/2017 | Nakamura | ............ | B63H 23/34 |
| 2019/0300136 A1* | 10/2019 | Nakamura | ............ | B63H 21/17 |
| 2021/0024193 A1* | 1/2021 | Nakamura | ........... | B63H 20/007 |
| 2022/0281577 A1* | 9/2022 | Kawai | .................... | B63H 23/34 |

FOREIGN PATENT DOCUMENTS

JP    2017-178159    10/2017

* cited by examiner

Primary Examiner — S. Joseph Morano
Assistant Examiner — Jovon E Hayes
(74) Attorney, Agent, or Firm — Amin, Turocy & Watson, LLP

(57) ABSTRACT

An outboard motor 10 includes a first drive shaft 26, a second drive shaft 27, and a decelerator 28. The first drive shaft 26 outputs a torque from a drive motor 25. The second drive shaft 27 is disposed parallel to the first drive shaft 26 and transmits the torque to a propeller shaft 31 to which a propeller 32 is connected. The decelerator 28 is disposed between the first drive shaft 26 and the second drive shaft 27 and transmits the torque from the first drive shaft 26 to the second drive shaft 27. The drive motor 25 is disposed below the decelerator 28.

3 Claims, 3 Drawing Sheets

OUTBOARD MOTOR

CROSS-REFERENCE TO RELATED APPLICATION

Priority is claimed on Japanese Patent Application No. 2021-035255, filed Mar. 5, 2021, the content of which is incorporated herein by reference.

BACKGROUND OF THE INVENTION

Field of the Invention

The present invention relates to an outboard motor.

Description of Related Art

In general, outboard motors transmit, in a standard posture of a usage state, a rotational output of a power engine or electric motor to a drive shaft disposed in a vertical direction and convert rotation of the drive shaft into rotation around a horizontal shaft through a bevel gear to transmit it to a propeller shaft. By rotating the propeller shaft, a propeller attached to the propeller shaft is rotated around the horizontal shaft to propel a hull.

Here, an outboard motor in which, in a standard posture, a crankshaft of an engine is disposed horizontally and rotation of the engine is transmitted to a drive shaft via a power transmission mechanism including a bevel gear mechanism or the like is known. The engine is disposed above the power transmission mechanism (hereinafter referred to as a decelerator).

According to this outboard motor, by disposing the crankshaft of the engine horizontally, it is possible to keep the engine low to some extent with respect to a hull (see, for example, Patent Document 1 (Japanese Patent Application, First Publication No. 2017-178159)).

SUMMARY OF THE INVENTION

However, in the outboard motor of Patent Document 1, the engine is disposed above the decelerator. Accordingly, it is difficult to keep the engine (that is, a drive source) sufficiently low with respect to the hull. For this reason, it is difficult to ensure a good external appearance for the outboard motor, effective utilization of a space above the outboard motor, reduction of engine noise, and the like, and there is room for improvement from this point of view.

An object of the present invention is to provide an outboard motor in which a drive source can be kept sufficiently low with respect to a hull.

In order to solve the above problems, an outboard motor of the present invention has adopted the following configurations.

(1) An outboard motor according to one aspect of the present invention is an outboard motor that propels a hull by rotating a propeller with a drive source, including: a first drive shaft that outputs a torque from the drive source; a second drive shaft that is disposed parallel to the first drive shaft and transmits the torque to an output shaft to which the propeller is connected; and a decelerator that is disposed between the first drive shaft and the second drive shaft and transmits the torque from the first drive shaft to the second drive shaft, in which the drive source is disposed below the decelerator.

According to the aspect (1), the first drive shaft that outputs the torque from the drive source and the second drive shaft that transmits the torque to the output shaft are disposed parallel to each other. The decelerator that transmits the torque from the first drive shaft to the second drive shaft is disposed between the first drive shaft and the second drive shaft. Further, the drive source is disposed below the decelerator.

Accordingly, a height of the drive source (that is, the outboard motor) can be kept sufficiently low with respect to the hull (for example, a stern). Thus, for example, the outboard motor can be made invisible from the hull side, and an external appearance of the hull on its rear side can be made clear. Further, a space above the outboard motor can be effectively used. Furthermore, for example, the drive source can be partitioned from the hull at the stern, and a drive sound of the drive source can be reduced by being blocked at the stern.

(2) In the outboard motor according to the above aspect (1), the drive source may be an electric machine disposed longitudinally, and a liquid level height of a liquid that cools the electric machine may be set within a range in which a coil provided in a lower portion of a stator is immersed and is located below a rotor.

According to the aspect (2), the electric machine (an electric motor) disposed longitudinally is used as the drive source. The liquid level height of the liquid for cooling is set within the range in which the coil provided in the lower portion of the stator is immersed in the liquid and the liquid is located below the rotor. Accordingly, an amount of liquid supplied for cooling the electric machine can be reduced. Thus, a capacity of a pump that circulates the liquid can be reduced, and friction of the electric machine caused by the liquid can be reduced.

The liquid level height is set to be located below the rotor. Thus, for example, it is possible to inhibit the liquid from entering an air gap between the stator and the rotor and increasing the friction.

Further, by immersing the coil in the liquid, the number of distribution units for distributing the liquid to the coil can be reduced.

(3) In the outboard motor according to the above aspect (2), a suction port of a liquid pump may be provided on a side on which the coil is disposed and in the vicinity of the coil.

According to the aspect (3), the suction port of the liquid pump is provided in the vicinity of the coil on the side on which the coil is disposed. Accordingly, by smoothly guiding the liquid guided to the coil to the suction port, it is possible to prevent the liquid from staying around the coil. Thus, heat exchange is performed between the electric machine and the liquid, and the electric machine can be satisfactorily cooled by the liquid.

(4) In the outboard motor according to the above aspect (3), a flow path through which the liquid flows to the suction port along the coil may be provided.

According to the aspect (4), the flow path through which the liquid flows to the suction port is formed along the coil. Accordingly, the liquid guided to the coil can be smoothly guided to the suction port through the flow path. Thus, heat exchange is performed between the electric machine and the liquid, and the electric machine can be satisfactorily cooled by the liquid.

(5) In the outboard motor according to the above aspect (4), a plurality of cooling pipes that are provided on an outer circumferential side of the stator at intervals in a circumferential direction thereof and extend along a rotation shaft of the electric machine to guide the liquid to the stator may be provided, and the liquid that has been guided from the plurality of cooling pipes to cool the stator may be guided to the flow path.

According to the aspect (5), the plurality of cooling pipes extend along the first drive shaft on the outer circumferential side of the stator. The plurality of extended cooling pipes are used to guide the liquid to the stator. Further, the liquid that has been guided from the plurality of cooling pipes to cool the stator is guided to the flow path. Thus, the liquid that has cooled the stator can be smoothly guided to the suction port through the flow path, and the electric machine can be effectively cooled.

According to the present invention, the drive source is disposed below the decelerator. Thus, the drive source can be kept sufficiently low with respect to the hull.

DETAILED DESCRIPTION OF THE INVENTION

An embodiment of the present invention will be described below with reference to the drawings. Also, "Fr" indicates forward with respect to a traveling direction, and "Rr" indicates rearward with respect to the traveling direction. Hereinafter, "forward with respect to the traveling direction" may be simply referred to as "forward," and "rearward with respect to the traveling direction" may be simply referred to as "rearward." A "front to rear direction with respect to the traveling direction" may be simply referred to as a "front to rear direction." Hereinafter, an outboard motor 10 of the embodiment will be described based on a standard posture in which a first drive shaft 26 and a second drive shaft 27 are disposed substantially vertically, and a propeller shaft 31 is disposed in the front to rear direction.

Figure 1:
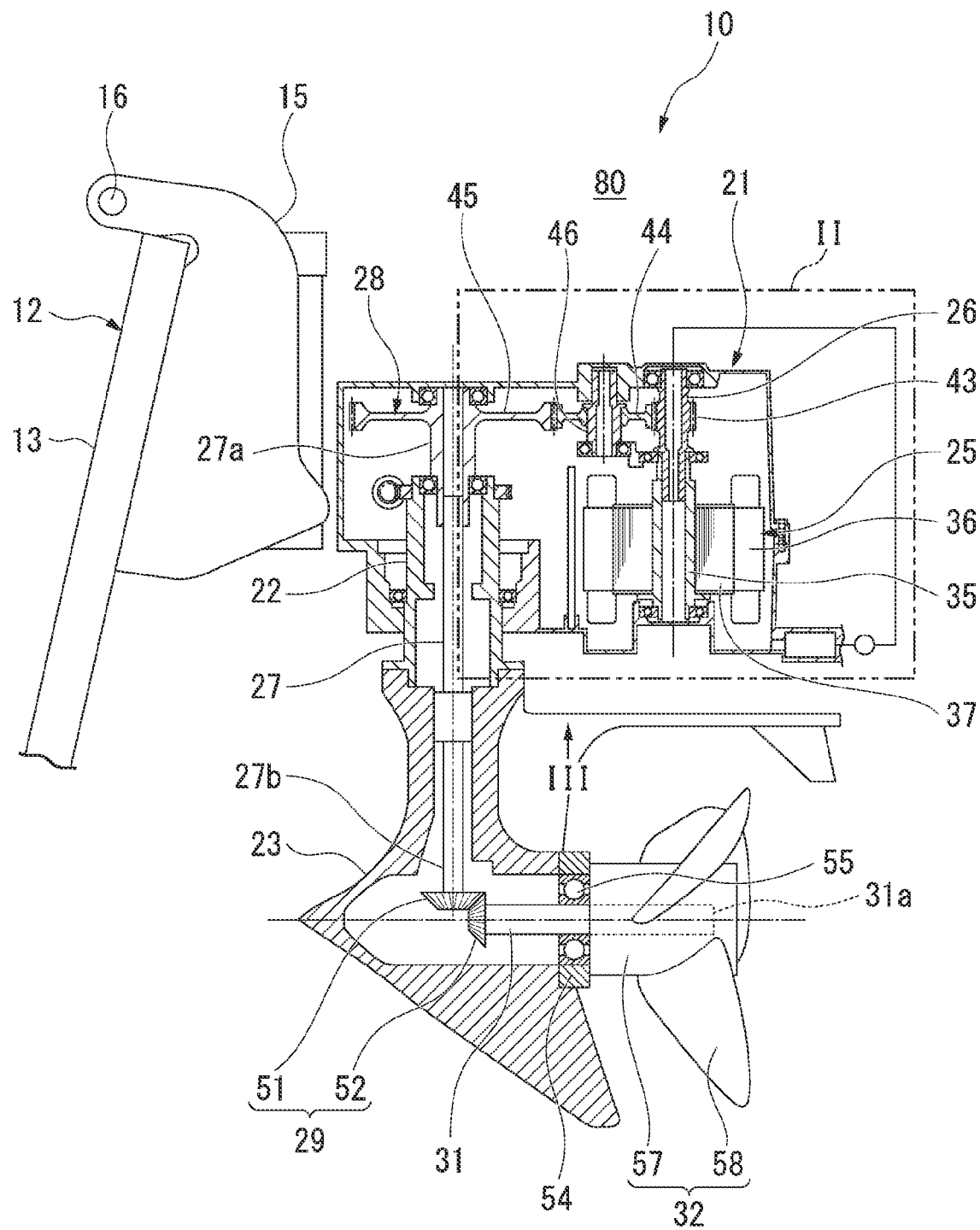
FIG. 1 is a cross-sectional view showing an outboard motor according to an embodiment of the present invention.

As shown in FIG. 1, the outboard motor 10 is a propelling device that is provided in a stern 13 of a hull 12 via a stern bracket 15 to propel the hull 12.

The outboard motor 10 includes a case 21, a drive shaft case 22, a gear case 23, a drive motor (a drive source or an electric machine) 25, the first drive shaft 26, the second drive shaft 27, a reduction mechanism 28 (a decelerator), a bevel gear mechanism 29, the propeller shaft (an output shaft) 31, and a propeller 32.

The case 21 is mounted on the stern 13 of the hull 12, for example, via the stern bracket 15. More specifically, the stern bracket 15 is fixed to the stern 13 of the hull 12, and the case 21 is fixed to the stern bracket 15. The case 21 is supported to be swingable in a vertical direction via a tilt shaft 16 of the stern bracket 15. The drive motor 25 and the reduction mechanism 28 are housed in the case 21.

Figure 2:
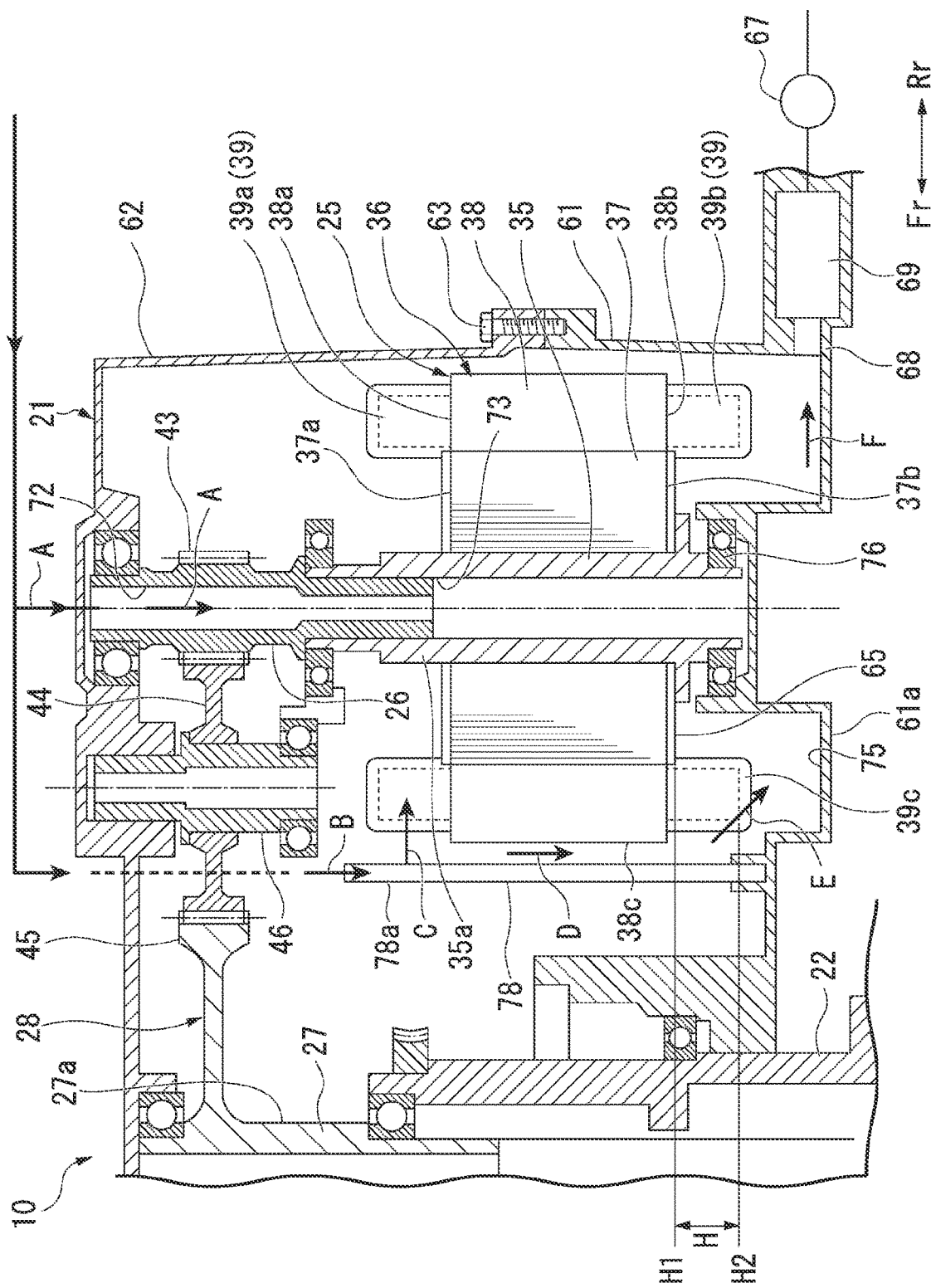
FIG. 2 is an enlarged cross-sectional view of section II in FIG. 1.

As shown in FIGS. 1 and 2, the drive motor 25 is an electric motor that serves as a power source for rotating the propeller 32, which will be described later. The drive motor 25 is disposed so-called longitudinally, for example, with its rotation shaft 35 oriented in the vertical direction. In the drive motor 25, a rotor 37 is rotatably supported inside a stator 36.

The stator 36 is provided with a coil 39 on a stator core 38. In the coil 39, an upper coil 39a protrudes upward from an upper surface 38a of the stator core 38, and a lower coil 39b protrudes downward from a lower surface 38b of the stator core 38. Hereinafter, the lower coil 39b may be simply referred to as a "coil 39b."

For example, an upper surface 37a of the rotor 37 is disposed to be substantially flush with the upper surface 38a of the stator core 38, and a lower surface 37b thereof is disposed to be substantially flush with the lower surface 38b of the stator core 38.

The rotation shaft 35 is supported by the rotor 37, and the first drive shaft 26 is coaxially connected to an upper end portion 35a of the rotation shaft 35. The first drive shaft 26 is a shaft that is disposed substantially vertically and outputs a torque from the drive motor 25 to the reduction mechanism 28 (which will be described later). The second drive shaft 27 is disposed parallel to the first drive shaft 26 on the hull 12 side (that is, a front side) with a gap therebetween. The reduction mechanism 28 is disposed between the first drive shaft 26 and an upper end portion 27a of the second drive shaft 27.

The reduction mechanism 28 includes, for example, a drive gear 43, an idle gear 44, and a driven gear 45. The drive gear 43 is coaxially fixed to the first drive shaft 26 and engages with the idle gear 44. The idle gear 44 is coaxially fixed to an idle shaft 46. The idle shaft 46 is rotatably supported by the case 21 between the first drive shaft 26 and the second drive shaft 27 in a state in which it is disposed parallel to the shafts 26 and 27. The driven gear 45 engages with the idle gear 44.

The driven gear 45 is coaxially fixed to the upper end portion 27a of the second drive shaft 27. Accordingly, rotation of the first drive shaft 26 can be transmitted to the second drive shaft 27 via the drive gear 43, the idle gear 44, and the driven gear 45. In other words, a torque from the first drive shaft 26 can be transmitted to the second drive shaft 27 via the drive gear 43, the idle gear 44, and the driven gear 45 (that is, the reduction mechanism 28).

By interposing the idle gear 44 between the drive gear 43 and the driven gear 45, rotation directions of the drive gear 43 and the driven gear 45 are set to the same direction.

The number of teeth of the drive gear 43, the idle gear 44, and the driven gear 45 is set such that a rotation speed of the second drive shaft 27 is reduced with respect to a rotation speed of the first drive shaft 26. In this state, the drive motor 25 is disposed below the reduction mechanism 28.

The reason why the drive motor 25 is disposed below the reduction mechanism 28 will be described in detail later.

As shown in FIG. 1, the second drive shaft 27 is disposed substantially vertically and extends from the case 21 to the inside of the gear case 23 via the drive shaft case 22. A lower end portion 27b of the second drive shaft 27 is connected to the bevel gear mechanism 29 inside the gear case 23.

The bevel gear mechanism 29 includes a first bevel gear 51 on an input side and a second bevel gear 52 on an output side. The first bevel gear 51 is coaxially fixed to the first drive shaft 26 and engages with the second bevel gear 52. The second bevel gear 52 is coaxially fixed to the propeller shaft 31. The bevel gear mechanism 29 is housed in the gear case 23. The gear case 23 is integrally fixed to the drive shaft case 22.

The propeller shaft 31 extends in a direction intersecting the first drive shaft 26 and rearward from the second bevel gear 52. That is, the propeller shaft 31 is connected to intersect the first drive shaft 26 via the bevel gear mechanism 29. The propeller shaft 31 has a base end portion fixed to the second bevel gear 52 housed in the gear case 23.

The propeller shaft 31 protrudes rearward from the second bevel gear 52 via a propeller holder 54. The propeller holder 54 is fixed to the gear case 23. For example, the base end portion of the propeller shaft 31 is rotatably supported by the propeller holder 54 via a bearing 55. The propeller 32 for propelling is connected to a portion 31a of the propeller shaft 31 that protrudes rearward from the propeller holder 54. The propeller 32 is provided with blades 58 on a propeller cylinder portion 57 that rotates together with the propeller shaft 31. The propeller cylinder portion 57 extends horizontally rearward from the propeller holder 54.

According to the outboard motor 10, by driving the drive motor 25, the rotation of the rotation shaft 35 is transmitted to the first drive shaft 26, the reduction mechanism 28, the second drive shaft 27, the bevel gear mechanism 29, and the propeller shaft 31. In other words, by driving the drive motor 25, the torque of the rotation shaft 35 is transmitted to the second drive shaft 27 via the first drive shaft 26 and the reduction mechanism 28. The torque transmitted to the second drive shaft 27 is transmitted to the propeller shaft 31 via the bevel gear mechanism 29.

Accordingly, the propeller shaft 31 rotates to cause the propeller 32 to rotate, thereby propelling the hull 12.

Here, as shown in FIG. 2, the case 21 includes a lower case 61 and an upper case 62. The lower case 61 and the upper case 62 are fixed by a plurality of bolts 63. A bottom portion 61a of the lower case 61 stores, for example, oil (a liquid) that cools and lubricates the drive motor 25, the reduction mechanism 28, and the like. The oil for cooling and lubricating will be described below as "cooling oil."

The cooling oil is set such that an oil level height (a liquid level height) is within a range H from H1 to H2 in a driving state. The oil level height H1 is, for example, a position at which a lower portion of the rotor 37 (for example, an end plate 65 on a lower side of the rotor 37) is not immersed in the cooling oil. The oil level height H2 is, for example, a position at which a lower end 39c of the lower coil 39b provided in a lower portion of the stator 36 is immersed in the cooling oil.

That is, the cooling oil is immersed in the lower coil 39b, and the oil level heights H1 and H2 are set within the range H located below the rotor 37. Accordingly, an amount of cooling oil supplied to cool the drive motor 25 can be reduced. Thus, a capacity of an oil pump (a liquid pump) 67 that circulates the cooling oil can be reduced, and friction of the drive motor 25 due to the cooling oil can be reduced.

The oil level heights H1 and H2 of the cooling oil are set to be located below the rotor 37. Thus, for example, it is possible to prevent the cooling oil from entering an air gap between the stator 36 and the rotor 37 and increasing the friction.

Further, by immersing the coil 39b in the cooling oil, it is possible to reduce the number of distribution units for distributing the cooling oil to the coil 39b.

Figure 3:
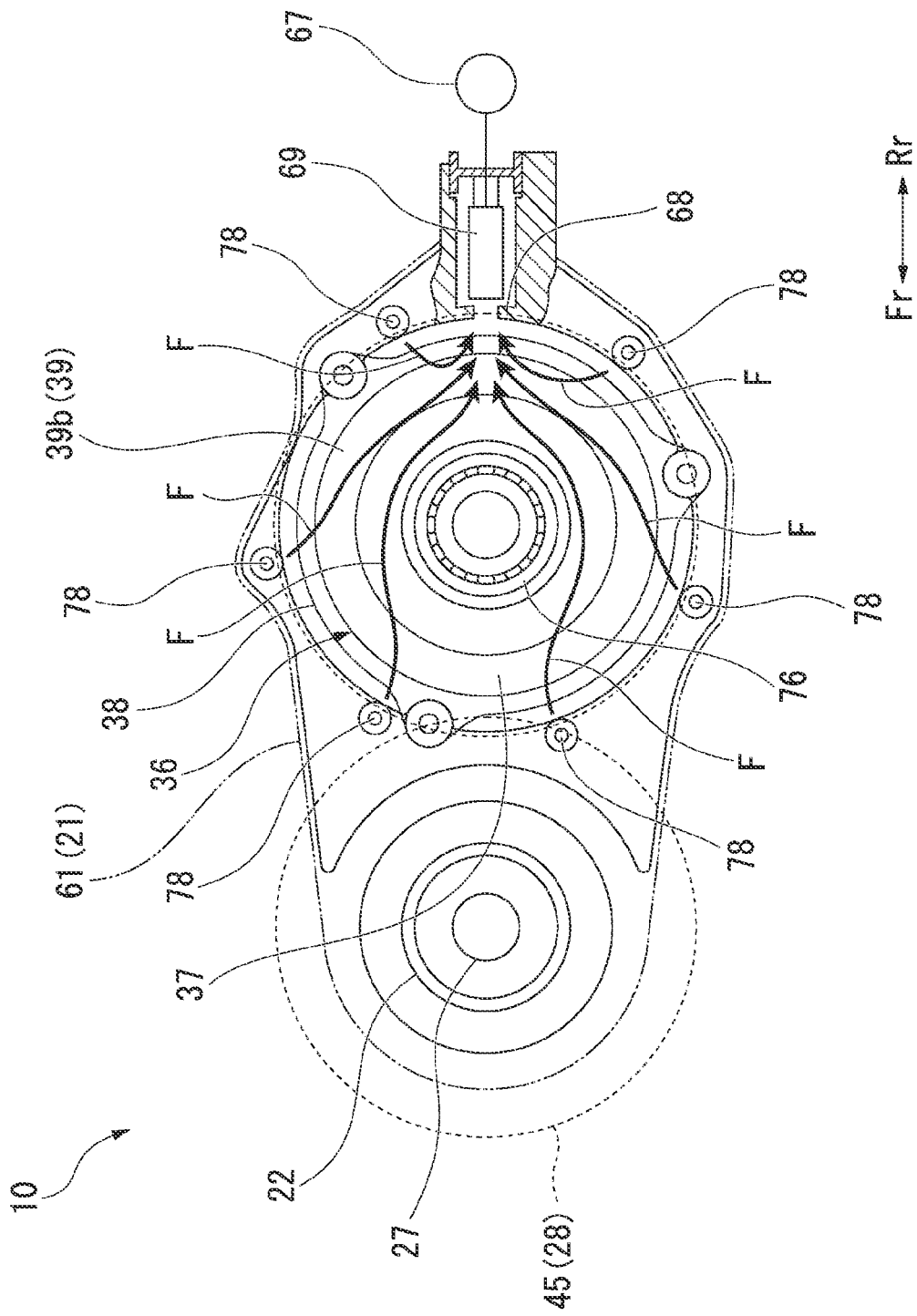
FIG. 3 is a bottom view showing a case with an imaginary line when viewed in a direction of arrow III in FIG. 1.

As shown in FIGS. 2 and 3, a suction port 68 of the oil pump 67 is provided at the bottom portion 61a of the lower case 61 on a side on which the coil 39b is disposed. Further, the suction port 68 of the oil pump 67 is provided in the vicinity of the coil 39b.

Here, the cooling oil sucked from the suction port 68 is guided to the oil pump 67 via a strainer 69. The cooling oil guided to the oil pump 67 is guided to a drive shaft flow path 72 of the first drive shaft 26 and a rotation shaft flow path 73 of the rotation shaft 35 via the oil pump 67 as shown by the arrow A, and is guided to a plurality of cooling pipes 78, which will be described later.

Also, the reason for providing the suction port 68 in the vicinity of the coil 39b at the bottom portion 61a of the lower case 61 will be described in detail later.

A case flow path (a flow path) 75 is formed in the bottom portion 61a of the lower case 61. The case flow path 75 is formed such that the cooling oil flows (is guided) along the coil 39b to the suction port 68. Specifically, for example, the case flow path 75 is formed in an annular shape along the coil 39b around a bearing 76 and communicates with the suction port 68.

The reason why the case flow path 75 is formed in an annular shape along the coil 39b and communicates with the suction port 68 will be described in detail later.

Further, the plurality of cooling pipes 78 are provided on an outer circumferential side of the stator core 38 at intervals in a circumferential direction of the stator core 38. The plurality of cooling pipes 78 extend in the vertical direction along the rotation shaft 35 of the drive motor 25. The oil guided to the oil pump 67 is guided to the arrow A and to the plurality of cooling pipes 78 as shown by the arrow B.

The reason why the plurality of cooling pipes 78 are provided at intervals in the circumferential direction of the stator core 38 will be described in detail later.

As described above, according to the outboard motor 10 of the embodiment, as shown in FIG. 1, the drive motor 25 is disposed below the reduction mechanism 28. Accordingly, a height of the drive motor 25 (that is, the outboard motor 10) can be kept sufficiently low with respect to the hull 12 (for example, the stern 13). Thus, for example, the outboard motor 10 can be made invisible from the hull 12 side, and an external appearance of the hull 12 on its rear side can be made clear. Further, an upper space 80 of the outboard motor 10 can be effectively utilized. Furthermore, for example, the drive motor 25 can be partitioned in the stern 13 when viewed from the hull 12 side. Thus, a drive noise of the drive motor 25 can be reduced by blocking it in the stern 13.

As shown in FIGS. 2 and 3, the plurality of cooling pipes 78 are provided at intervals in the circumferential direction of the stator core 38. The plurality of cooling pipes 78 guide the cooling oil distributed from the oil pump 67 to an outer circumferential surface 38c of the stator core 38 as shown by the arrow C. The cooling oil guided to the outer circumferential surface 38c of the stator core 38 is guided along the outer circumferential surface 38c of the stator core 38 as shown by the arrow D and cools the stator core 38 (that is, the stator 36) and the like. The cooling oil that has cooled the stator 36 is guided to the bottom portion 61a (that is, the case flow path 75) of the lower case 61 and the coil 39b as shown by the arrow E.

Thus, the cooling oil that has cooled the stator 36 can be smoothly guided to the suction port 68 via the case flow path 75, and the drive motor 25 can be effectively cooled.

Further, the suction port 68 is provided in the vicinity of the coil 39b at the bottom portion 61a of the lower case 61. Accordingly, the cooling oil guided to the coil 39b can be smoothly guided to the suction port 68 as shown by the arrow F. Thus, it is possible to prevent the cooling oil from staying around the coil 39b. Therefore, heat exchange is performed between the drive motor 25 and the cooling oil, and the drive motor 25 can be satisfactorily cooled by the cooling oil.

In addition, the case flow path 75 is formed in an annular shape along the coil 39b and communicates with the suction port 68. Accordingly, the cooling oil guided to the coil 39b can be smoothly guided to the suction port 68 via the case flow path 75 as shown by the arrow F. Thus, heat exchange is performed between the drive motor 25 and the cooling oil more satisfactorily, and the drive motor 25 can be cooled more satisfactorily with the cooling oil.

Also, the technical scope of the present invention is not limited to the above-described embodiment, and various changes can be made without departing from the spirit of the present invention.

In addition, it is appropriately possible to replace constituent elements in the above-described embodiment with well-known constituent elements without departing from the spirit of the present invention, and the above-mentioned modified examples may be appropriately combined.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Outboard motor
12 Hull
25 Drive motor (drive source or electric machine)
26 First drive shaft (first drive shaft)
27 Second drive shaft (second drive shaft)
28 Reduction mechanism (decelerator)
31 Propeller shaft (output shaft)
32 Propeller
35 Rotation shaft
36 Stator
37 Rotor
38 Stator core
38*c* Outer circumferential surface
39 Coil
39*b* Lower coil
67 Oil pump (liquid pump)
68 Suction port
75 Case flow path (flow path)
78 Cooling pipe
H Range
H1, H2 Liquid level height

What is claimed is:

1. An outboard motor that propels a hull by rotating a propeller with a drive source, comprising:
   a first drive shaft that outputs a torque from the drive source;
   a second drive shaft that is disposed parallel to the first drive shaft and transmits the torque to an output shaft to which the propeller is connected; and
   a decelerator that is disposed between the first drive shaft and the second drive shaft and transmits the torque from the first drive shaft to the second drive shaft,
   wherein the drive source is disposed below the decelerator,
   the drive source is an electric machine disposed longitudinally,
   a liquid level height of a liquid that cools the electric machine is set within a range in which a coil provided in a lower portion of a stator is immersed and is located below a rotor, and
   a suction port of a liquid pump is provided on a side on which the coil is disposed and in the vicinity of the coil.

2. The outboard motor according to claim 1, further comprising a flow path through which the liquid flows to the suction port along the coil.

3. The outboard motor according to claim 2, further comprising a plurality of cooling pipes that are provided on an outer circumferential side of the stator at intervals in a circumferential direction thereof and extend along a rotation shaft of the electric machine to guide the liquid to the stator,
   wherein the liquid that has been guided from the plurality of cooling pipes to cool the stator is guided to the flow path.

\* \* \* \* \*